United States Patent [19]

Momose et al.

[11] 4,441,810

[45] Apr. 10, 1984

[54] RANGE FINDER

[75] Inventors: Haruhiko Momose, Hachioji; Toshiaki Takahashi, Hino; Yasushi Hoshino, Tokyo, all of Japan

[73] Assignee: Konishiroku Photo Industry Co., Ltd., Tokyo, Japan

[21] Appl. No.: 281,890

[22] Filed: Jul. 9, 1981

[30] Foreign Application Priority Data

Jul. 15, 1980 [JP] Japan .................................. 55-97331
Jul. 21, 1980 [JP] Japan .................................. 55-99617
Jul. 21, 1980 [JP] Japan .................................. 55-99618
Jul. 23, 1980 [JP] Japan .................................. 55-101807
Jul. 30, 1980 [JP] Japan .................................. 55-105608

[51] Int. Cl.$^3$ .............................................. G01C 3/00
[52] U.S. Cl. .......................................... 356/1; 356/4; 354/403
[58] Field of Search ................ 356/1, 4; 354/25 R, 354/25 P

[56] References Cited

U.S. PATENT DOCUMENTS 3,054,898  9/1962  Westover ........................ 250/348
3,227,033  1/1966  Whyte ............................. 356/4
3,619,058  11/1971 Hewlett ........................... 356/5
4,267,440  5/1981  Kitai ............................ 354/25 P

FOREIGN PATENT DOCUMENTS

55-40959  3/1980  Japan ................................ 356/1

Primary Examiner—Maynard R. Wilbur
Assistant Examiner—M. R. Gordon
Attorney, Agent, or Firm—James E. Nilles

[57] ABSTRACT

A range finder for measuring the distance of an object to be measured by the steps of radiating the spot light to the object, forming an image of the reflected ray of light by image forming means and measuring the distance of the object from the output of an element which is disposed at a position substantially corresponding to the image forming position and of which output varies in accordance with the light-receiving position on the light-receiving surface. PSD are used as the element. A focussing detector which includes a semiconductor position detection element PSD placed at a position corresponding to the film surface in a camera or the like and detects the focussing state on the basis of the electric output from the semiconductor position detection element PSD. A focussing detector which comprises image forming means for forming the image of an object; a PSD disposed in such an arrangement that the light-receiving surface thereof is eccentric with respect to the optical axis of an optical system including the image forming means and disposed at the back of the image forming means; and an operation circuit detecting the extreme values of the output of the PSD and producing a focussing signal.

6 Claims, 18 Drawing Figures

RANGE FINDER

BACKGROUND OF THE INVENTION

1. Field of the Invention:

This invention relates to a range finder using semiconductor position detection elements for use in a camera or the like.

Figure 1A:
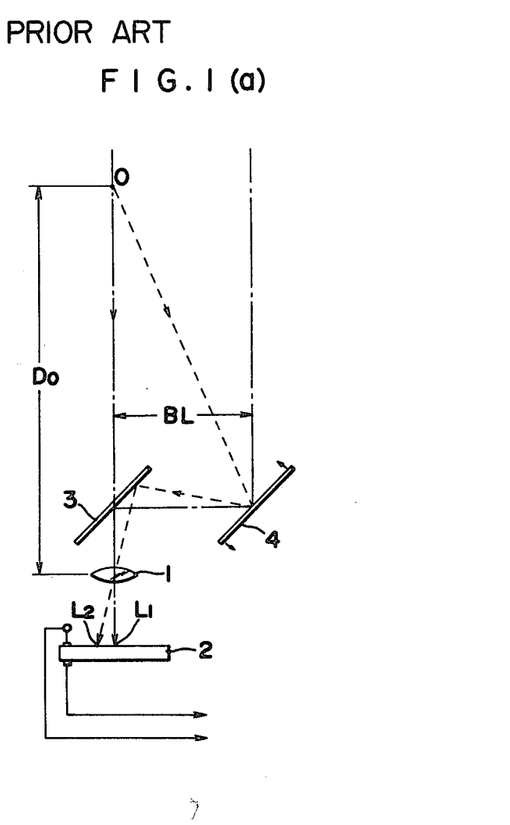
Figure 1B:
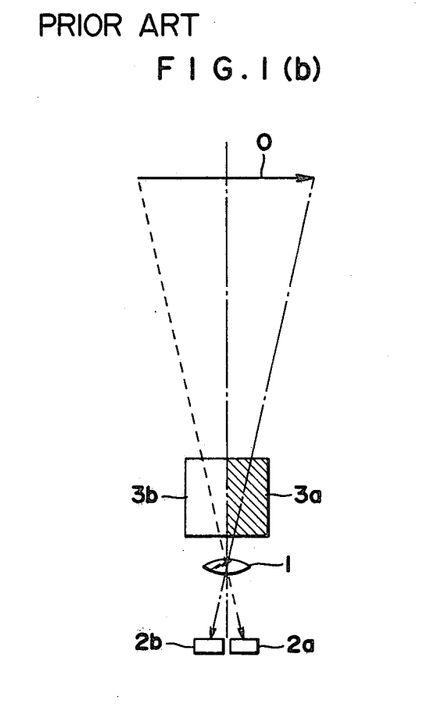

2. Description of the Prior Art:

A large number of methods have been known of range finders using semiconductor position detection elements. An example of the prior art device relatively analogous to the range finder of the present invention is shown in FIG. 1. FIG. 1(a) is a front view of the prior art device and FIG. 1(b) is its side view. An image forming lens 1 is fixedly disposed, and at positions substantially corresponding to the image forming position of this lens 1 are disposed semiconductor position detection elements 2a, 2b divided into two stages to the right and left of the optical axis. A reflecting mirror 3 is fixed at an angle of 45° ahead of the lens 1. The right-hand portion 3a of the reflecting mirror 3 relative to the optical axis is a transparent portion and the left-hand portion 3b, a reflecting mirror portion. A moving mirror 4 is so disposed as to be spaced apart by the length of a basic line BL from the reflecting mirror 3. An optical image of an object O passes through the transparent portion 3a of the reflecting mirror and the lens 1 forms an optical image $L_1$ on the semiconductor position detection element 2b. On the other hand, the optical image of the object, that is reflected by the moving mirror 4 and by the reflecting mirror portion 3b and passes through the reflecting lens 1, forms an optical image $L_2$ on the semiconductor position detection element 2a.

Figure 2:
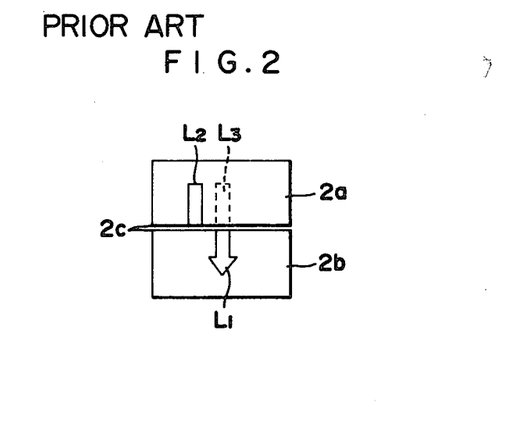
FIG. 2 shows the position detection element of FIG. 1 as it is viewed from the top.

FIG. 2 shows the semiconductor position detection elements 2a, 2b of FIG. 1(a) as they are viewed from the top. The optical image $L_2$ moves when the moving mirror 4 is rotated. The distance of the object can be determined from the rotating position of the moving mirror 4 when the optical image $L_2$ moves to $L_3$. Coincidence of the optical image $L_1$ with $L_3$ is picked up from signals of the semiconductor position detection elements 2a, 2b and the point of coincidence is electrically determined when both values are most approximate to each other.

The abovementioned method can virtually be established by the fact that the optical image is continuous for the boundary portion 2c between the two semiconductor position detection elements 2a, 2b, but not for the entire surfaces of the detection elements 2a, 2b.

For the reason noted above, a satisfactorily high level of measuring accuracy can not be expected.

SUMMARY OF THE INVENTION

The present invention is therefore directed to provide a range finder having a high level of measuring accuracy by a system which detects and compares the same optical image only the field of view of which is slightly changed using one detection element.

In accordance with the present invention, there is provided a range finder which comprises:

(a) image forming means disposed fixedly;

(b) a semiconductor position detection element placed at a position substantially corresponding to the image forming position of the image forming means;

(c) a semi-transparent reflecting mirror disposed ahead of the image forming means;

(d) a moving reflecting mirror so disposed as to be spaced apart by a length of a basic line from the semi-transparent reflecting mirror;

(e) driving means for relatively moving an optical image formed on the semiconductor position detection element by the moving reflecting mirror, the semi-transparent mirror and the image forming means with respect to an optical image formed on the semiconductor position detection element by the image forming means through the semi-transparent reflecting mirror;

(f) light-interception and memory means for temporarily intercepting the incident ray of light from the reflecting mirror to the semiconductor position detection element and temporarily storing in the interim only the incident ray of light through the semi-transparent reflecting mirror; and (g) an operation circuit for operating the output of the semiconductor position detection element and producing a distance signal of the object.

In a device for measuring the distance of an object to be measured by the steps of radiating the spot light to the object, forming an image of the reflected ray of light by image forming means and measuring the distance of the object from the output of an element which is disposed at a position substantially corresponding to the image forming position and of which output varies in accordance with the light-receiving positions on the light-receiving surface, it is another object of the present invention to provide a range finder which is characterized by use of a position sensitive detector (PSD) as the abovementioned element.

It is still another object of the present invention to perform automatic focussing adjustment of a camera by determining the distance of an object by making use of an electric signal generated in accordance with the position of the centroid of luminance of an optical image. Namely, the present invention is directed to provide a range finder which comprises:

(a) a first semiconductor position detection element consisting of first image forming means disposed fixedly and a PSD placed at a position substantially corresponding to the image forming position of the first image forming means;

(b) a second semiconductor position detection element consisting of second image forming means and a PSD placed at a position substantially corresponding to the image forming position of the second image forming means;

(c) driving means for relatively moving the second image forming means and the second semiconductor position detection element; and (d) an operation circuit for operating the outputs of opposing electrodes of the first and second semiconductor position detection elements and producing a distance signal of an object.

It is still another object of the present invention to provide a focussing detector which includes a semiconductor position sensitive detector PSD placed at a position corresponding to the film surface in a camera or the like and detects the focussing state on the basis of the electric output from the semiconductor position detection element PSD.

It is yet another object of the present invention to provide a range finder which comprises image forming means for forming the image of an object; a PSD disposed in such an arrangement that the light-receiving surface thereof is eccentric with respect to the optical axis of an optical system including the image forming means and disposed at the back of the image forming means; and an operation circuit detecting the extreme values of the output of the PSD and producing a focussing signal.

It is another object of the present invention to halve the image of an object to be measured either in the vertical direction or to the right and left by use of a split image prism arranged on a single measuring optical axis in the same way as in Japanese Patent Application Publication No. 6,046/1978, and to pick up electric signals in response to the position of the centroid of luminance of the optical image in each halved zone by use of PSDs as a pair of semiconductor position detection elements so that the focussing position is detected by processing these electric signals.

It is another object of the present invention to provide a range finder which comprises a lens for forming the image of an object; a split image prism juxtaposed at the back of the lens; a pair of semiconductor position detection elements using PSDs and so disposed at the back of the split image prism as to correspond thereto; and an operation circuit for operating the outputs of the pair of semiconductor position detection elements and producing a focussing signal.

These and other objects and features of the present invention will become more apparent from the following description to be read in conjunction with the accompanying drawings.

BRIEF DESCRIPTION OF THE DRAWINGS

FIG. 1 shows a conventional range finder and FIG. 1(a) is its front view and FIG. 1(b) is its side view;

DESCRIPTION OF THE PREFERRED EMBODIMENTS

Figures 3, 4:
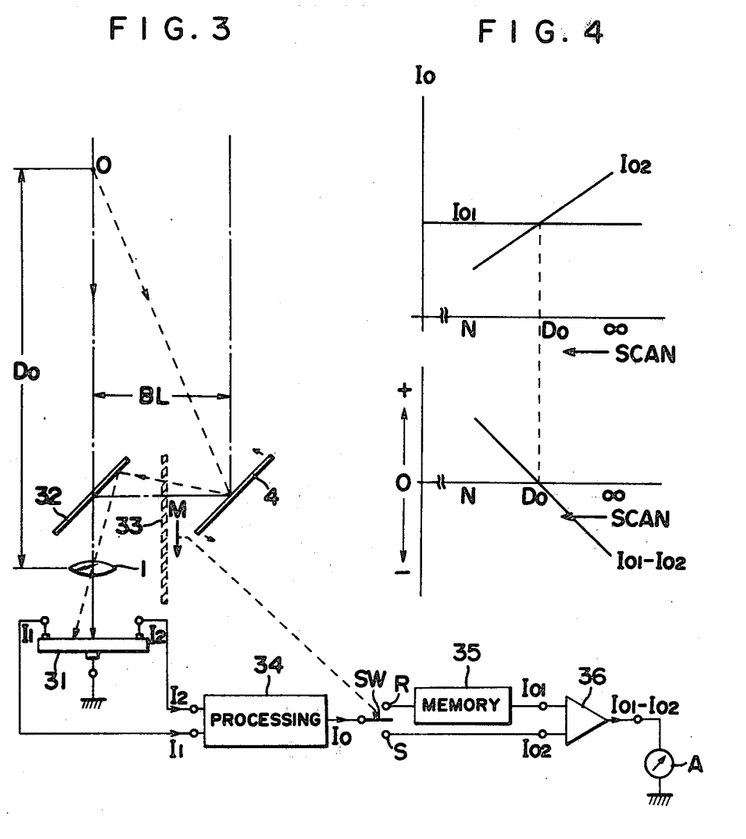
FIG. 3 shows the principle of an embodiment of the present invention.
FIG. 4 shows a diagram of scanning and a current value of the embodiment shown in FIG. 3.

FIG. 3 shows the principle of the present invention. Reference numeral 1 represents an image forming lens which is fixed with respect to an object O. A semiconductor position detection element 31 is placed at the position substantially corresponding to the image forming position of the lens 1. Especially excellent range finding characteristics can be obtained if a PSD is employed as the detection element 31, and the PSD itself will be described in detail elsewhere.

A half mirror 32 is fixed with an angle of 45° ahead of the lens 1. A moving mirror 4 is so disposed as to be spaced apart by the length of a basic line BL from the half mirror 32. A moving light-intercepting plate 33 is placed on an optical path of the ray of light reflected from the moving mirror 4. First, the light-intercepting plate 33 is set at such a position (represented by M in the drawing) at which it blocks the optical path of the ray of light reflected from the moving mirror 4, and an optical image passing through the half mirror 32 is received by the PSD 31. The output signal from the PSD 31 is processed by a position detection processing circuit 34 and is stored as a signal $I_{01}$ in a memory circuit 35 after it passes through a switch SW that is changed over to a terminal R.

Next, the light-intercepting plate 33 retreats from the optical path on the side of the moving mirror and at the same time, intercepts the optical path on the side of the transmission light (not shown in the drawing), whereupon the moving mirror 4 starts rotating.

The optical image reflected by the moving mirror 4 is received by the PSD 31. In this instance, the switch SW is changed over to the position of a terminal S along with movement of the light-intercepting plate 33 so that the output signal from the PSD 31 is applied to a comparator 36 as a varying signal $I_{02}$ in response to the rotation of the moving mirror 4 past through the detection processing circuit 34.

The comparator 36 compares the two signals $I_{01}$ and $I_{02}$ with each other and when the value $I_{01}-I_{02}$ becomes zero or minimal (or when a meter A indicates zero or a minimal value), the moving mirror 4 is placed at a position where double images coincide with each other. Thus, the distance $D_0$ of the object can be determined. FIG. 4 shows the relationship between the rotation (SCAN) of the moving mirror 4 and the output signal.

Next, the semiconductor position detection element PSD used in this embodiment will be described.

Figure 5A:
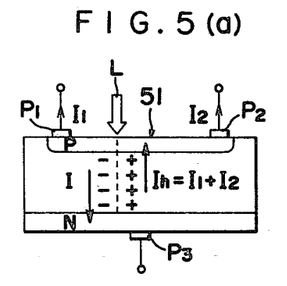
FIGS. 5(a), 5(b) and 5(c) show the concept of a PSD used in the embodiment of the present invention.
Figure 5B:
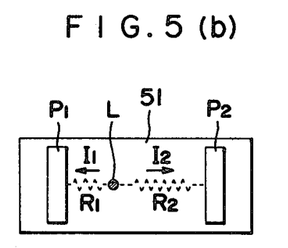
Figure 5C:
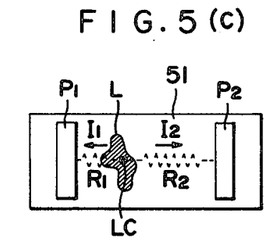

FIG. 5 shows the concept of an image position detector PSD which generates an electric signal in accordance with the position of the center of luminance of the optical image. FIG. 5(a) is a sectional view of the PSD and FIGS. 5(b) and 5(c) are its plan views. Electrodes $P_1$ and $P_2$ are positioned at both ends of a light-receiving surface 51 and an electrode $P_3$ is placed on the back. Now, when a light spot L strikes one point of the light receiving surface 51 of the PSD in FIG. 5(c), a positive and negative electron positive-hole pair occurs whereby the electron flows to the N layer and the positive hole to the P layer. After reaching the N layer, the electron flows as such through the electrode $P_3$. On the other hand, the positive hole must flow along the P layer if it is to reach the electrode after reaching the P layer. Since there is electric resistance in the P layer, however, the output currents $I_1$ and $I_2$ from the electrode $P_1$ and $P_2$ do not become equal to each other but are proportionally divided by resistance $R_1$ and $R_2$. In other words, the position of the light spot L can be determined from the difference of the output currents $I_1$ and $I_2$ that are divided by the resistance $R_1$ and $R_2$.

Since the output currents $I_1$ and $I_2$ depend upon the resistance from the centroid of luminance of the spot light, it is possible to obtain an output current divided by the centroid of luminance LC even when complicated spot light L such as shown in FIG. 5(c) is employed.

Figure 6:
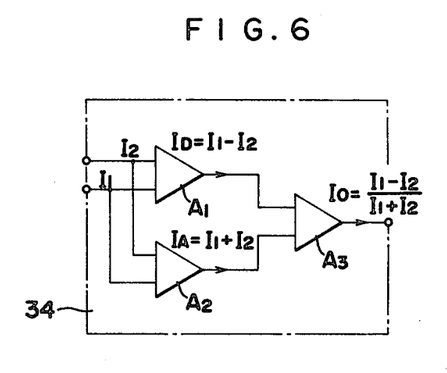
FIG. 6 shows the circuit construction of the position detection processing circuit used in the embodiment of the present invention.

FIG. 6 shows the circuit construction of the position detection processing circuit PDC. The position detection processing circuit PDC consists of a differential amplifier $A_1$, an addition amplifier $A_2$ and a division amplifier $A_3$, and divides a differential current $I_D$ (=$I_1$-$I_2$, position output) produced by the differential amplifier $A_1$ from the output currents $I_1$, $I_2$ of the image position detector PSD by an current $I_A$ (=$I_1$+$I_2$, full light current) produced by the addition amplifier $A_2$. In other words, it is a circuit that produces a division output current $I_0$ (=$I_D/I_A$) by the division amplifier $A_3$. Since $I_D$ is divided by $I_A$, the position signal $I_0$, which is constantly predetermined, can be produced without being influenced by the intensity of the reflected ray of light from the object, and a moving quantity of the centroid of luminance can accurately be determined.

In this embodiment, focus adjustment is effected by turning the moving mirror 4 while viewing the indication of the meter A and moving back and forth a camera lens that is actuated in the interlocking arrangement with the moving mirror 4. If a servo motor is employed instead of the meter A, an automatic focussing camera can be obtained.

In this embodiment, it is also possible to radiate the spot light to the object. Distance measurement by the radiation of the spot light is effective especially when the difference of luminance is extremely small between the object and the background.

Incidentally, since the addition current $I_A$ changes depending upon the luminance of the object in the position sensitive detector PSD used in the present invention, the PSD can be used not only for detecting the image position but also as a light-receiving element for exposure. The PSD construction is not limited to the one shown in the drawing, in particular and other constructions may also be employed so long as they produce an electric signal in accordance with the position of centroid of luminance of the optical image on the light-receiving element.

The embodiment of the present invention is based upon the principle that movement of the centroid of luminance of the optical image in the PSD can be electrically detected. As an element in which the output signal varies in accordance with movement of the position of the optical image, it is possible to employ a three-layered optical slide resistor consisting of a good conductor, a photoconductive substance such as CdS or CdSe and a belt-like resistor of carbon or the like such as one disclosed in Japanese Patent Application Publication No. 29,349/1975, by way of example. When such a resistor is employed in practice, however, the excellent effect of the present invention can not be obtained because noise suppression is practically difficult. It is also possible in principle to employ an image position detection element which consists of numerously divided element arrays and is placed at the position of the PSD. However, this system is not free from the problem in that the circuit construction such as a clock circuit, a switching circuit and the like becomes complicated. Although the use of these semiconductor detection elements is embraced within the technical scope of the present invention, the PSD of this embodiment can be compactly accommodated, eliminate the noise and improve the measuring accuracy.

Figure 7:
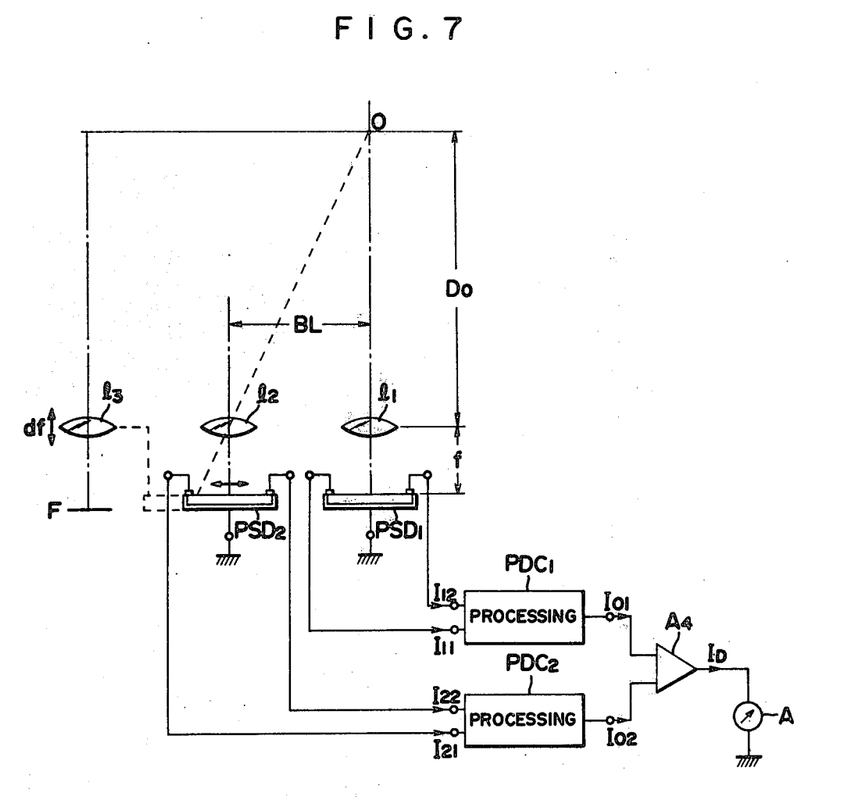
FIG. 7 shows another embodiment of the present invention.

FIG. 7 shows another embodiment of the present invention. In FIG. 7, $l_1$ and $l_2$ represent first and second image forming means (lenses) for range finding, having the same focal length. $l_3$ represents a camera lens. A first position sensitive detector $PSD_1$ is fixed at a position substantially corresponding to the image forming position of the lens $l_1$. A position sensitive detector $PSD_2$ capable of moving to the right and left is placed at a position substantially corresponding to the image forming position of the lens $l_2$. Preferably, the position sensitive detectors $PSD_1$ and $PSD_2$ have the same level of performance. Output cirrents $I_{11}$, $I_{12}$ and $I_{21}$, $I_{22}$ are picked up as electric signals from these position sensitive detectors $PSD_1$ and $PSD_2$, respectively, and are processed by position detection processing circuits $PDC_1$ and $PDC_2$, respectively, to yield electric signals $I_{01}$ and $I_{02}$.

When the relation of position becomes the same between the optical image on the position sensitive detector $PSD_1$ on the stationary side and the optical image on the position sensitive detector $PSD_2$ on the moving side, the outputs $I_{01}$ and $I_{02}$ from the position detection processing circuits $PDC_1$ and $PDC_2$ become equal to each other so that the output $I_D$ of the differential amplifier $A_4$ represents the minimum.

Here, if the moving direction and moving quantity of the position sensitive detector $PSD_2$ to the right and left are associated with the focussing adjusting direction and adjusting quantity of the camera lens $l_3$, focus adjustment of the camera lens $l_3$ can be effected while reading the indication of the meter A.

Figure 8:
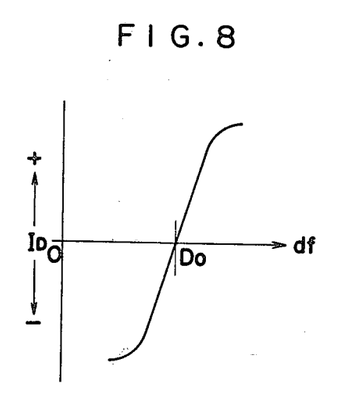
FIG. 8 shows a diagram of the relation between a differential current of the PSD and the distance of an object to be measured.

FIG. 8 shows the relation between the indication value of the meter A and the focal point and illustrates that when the focal point of the camera lens $l_3$ coincides with the distance D0 of the object O, the current value $I_D$ becomes zero.

Though the focal adjustment is effected while reading the indication of the meter A in this embodiment, it is possible to obtain an automatic focus camera by use of a lens stop magnet or a servo motor in place of the meter A.

In this embodiment, it is also possible to radiate the spot light to the object and this is effective for range finding when the difference of luminance is extremely small between the object and the background.

Furthermore, the lens $l_2$ in this embodiment is fixed while the position sensitive detector $PSD_2$ is movable. However, the same effect can also be obtained by fixing the position sensitive detector $PSD_2$ while allowing the lens $l_2$ to move, or by moving one of optical images in accordance with the conventional method that uses a moving mirror or the like.

The position sensitive detector PSD used in this embodiment can be used not only for the image detection but also as a light-receiving element for exposure since the addition current $I_A$ varies in accordance with the luminance of the object.

The distance measuring method by use of the above-mentioned range finder makes it possible to improve the measuring accuracy and to reduce the production cost and the size and weight of the device when compared with the conventional method which uses a distance detection element consisting of numerously divided element arrays. It also eliminates the problems with the conventional method by use of a three-layered optical slide resistor in that response is slow and noise suppression is difficult.

Figure 9:
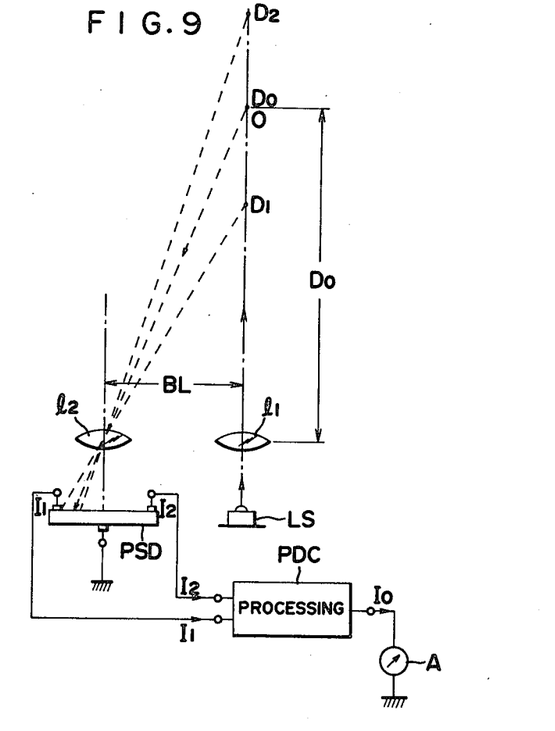
FIG. 9 shows still another embodiment of the present invention.

FIG. 9 shows still another embodiment of the present invention. The ray of light from the light source LS is projected towards the object as the spot light through an optical system $l_1$, and its reflected ray of light is received by the position sensitive detector PSD placed at the image forming position of the other optical system $l_2$. As described already, the output currents $I_1$ and $I_2$ depending upon the position of the centroid of luminance are picked up from the position sensitive detector PSD and are then processed by the position detection processing circuit PDC to provide an electric signal corresponding to the distance D0 to the object O.

Figure 10:
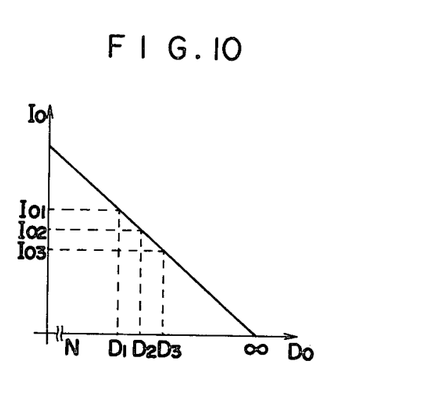
FIG. 10 shows a diagram of the relation between the division output of a position detection processing circuit and the distance of the object to be measured.

Incidentally, the division output $I_0$ in FIG. 6 is a signal which is related with the image moving quantity by the distance on the position sensitive detector PSD so that the distance Do of the object O can be obtained from the division output $I_0$ as depicted in FIG. 10.

Though the signals of the abovementioned position detection processing circuits are all processed by means of a current, it is of course possible to process them by a voltage or by the combination of a current with a voltage.

Figure 11:
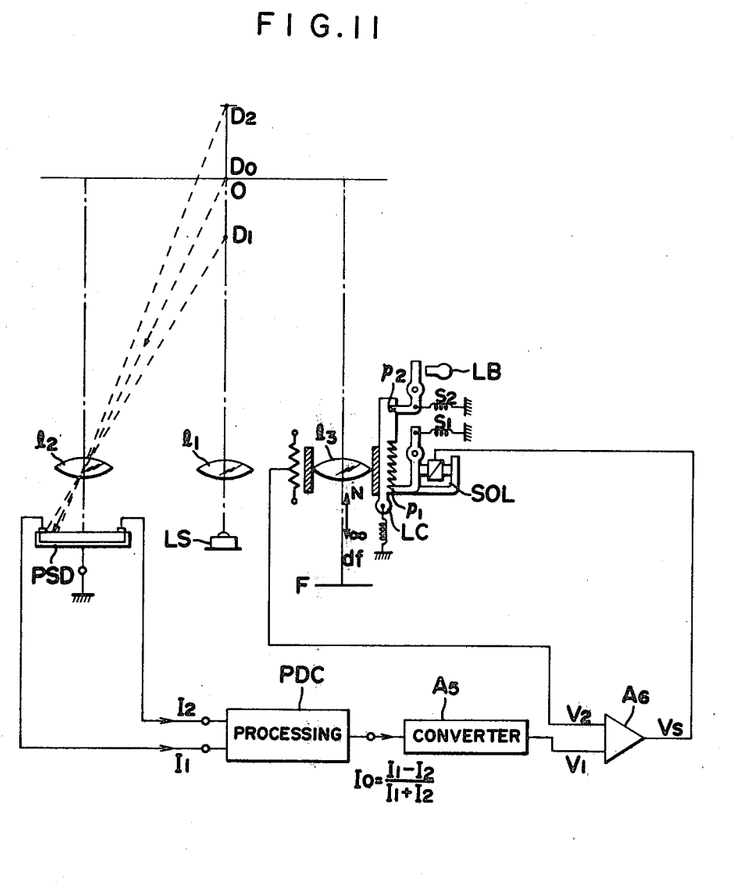
FIG. 11 shows an automatic focussing camera using the principle of the present invention.

FIG. 11 shows an example of an automatic focus camera using a ray distance meter type distance detector. In FIG. 11, when a release button LB is depressed, the lens barrel of the camera lens $l_3$ disengages from pawls $p_1$, $p_2$ and the focal point of the lens moves from the near side N to the remote side $\infty$. In the interim, the ray of light is projected from the light source LS to the object O through the optical system $l_1$. The division output $I_0$ from the aforementioned position detection processing circuit PDC is converted into a voltage $V_1$ corresponding to the distance Do of object O by a current-voltage converter $A_5$. On the other hand, a difference between a voltage $V_2$ corresponding to the barrel position of the camera lens $l_3$ and the voltage $V_1$ is produced from a differential amplifier $A_6$ as a voltage $V_s$. When the focal point of the camera lens $l_3$ reaches the distance Do, the voltage $V_2$ coincides with the voltage $V_1$, and the output $V_s$ from the differential amplifier $A_6$ becomes zero. When the output $V_0$ becomes zero, a lens stop solenoid SOL is released from the actuation state and the pawl $p_1$ is permitted by a spring force $S_1$ to drop into a rack LC and fixes the camera lens $l_3$ at a position corresponding to the distance Do, thereby accomplishing the automatic focussing.

As described above, the method which performs the distance measurement by means of the electric signal generated in accordance with the position of the centroid of luminance of the optical image due to the spot light produced from the camera using the position sensitive detector PSD of the present invention provides the advantages such as the improvement in the measuring accuracy and reduction of the production cost and the size and weight, in comparison with the conventional method using the optical slide resistor or the numerously divided element arrays.

The abovementioned method also eliminates the problem with the conventional method using the three-layered optical slide resistor in that response is slow and noise suppression is difficult. Since the centroid of luminance is detected, it is not necessary to secure a high level of accuracy of focussing in the image forming optical system even if the image on the PSD is not of focus to some extents.

Figure 12:
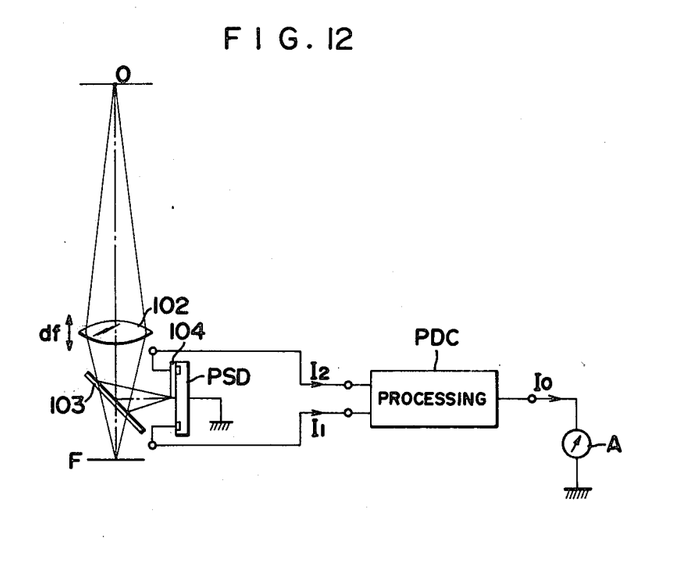
FIG. 12 shows still another embodiment of the present invention.

FIG. 12 shows still another embodiment of the present invention.

Figure 13:
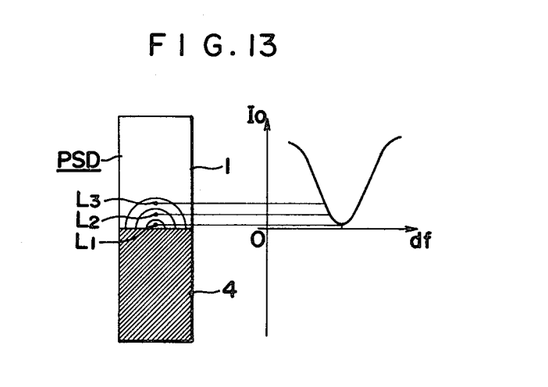
FIG. 13 shows a diagram of the relation between the centroid of luminance and an output current.

The optical image of the object O is formed on a film F through a moving lens 102 as the image forming means. A semi-transparent mirror 103 is disposed between the lens 102 and the film F and divides the optical path. The PSD is disposed in the same relationship of position as the film F with respect to the lens 102. As shown in FIG. 12, the upper portion of the PSD with respect to the optical path (the lower portion with respect to the optical path in FIG. 13) is intercepted by a mask 104. The interception of one side of the optical path provides the relationship of position which provides the greatest eccentric effect with respect to the optical axis of the optical system. Since one side of the PSD is thus intercepted, the centroid of luminance gradually moves to $L_1$, $L_2$, $L_3$ as the optical image L is out of focus and expands, as depicted in FIG. 13 (left-hand). In other words, the difference between the output currents $I_1$ and $I_2$ gradually increases. Since the effect of eccentricity can also be obtained by moving the optical axis towards the edge of the PSD light-receiving surface without using the mask, it is possible to obtain the change in the centroid of luminance due to mal-focussing.

In FIG. 12, the output currents $I_1$, $I_2$ from the PSD are taken out as the electric signals, that are then processed by the position detection processing circuit PDC similar to those used in the foregoing embodiments.

The left-hand portion of FIG. 13 shows the relationship between the mal-focussing state and the division output current $I_0$.

Focussing can be attained by adjusting the camera lens 102 so that the meter A of FIG. 12 indicates a minimal value.

Figure 14:
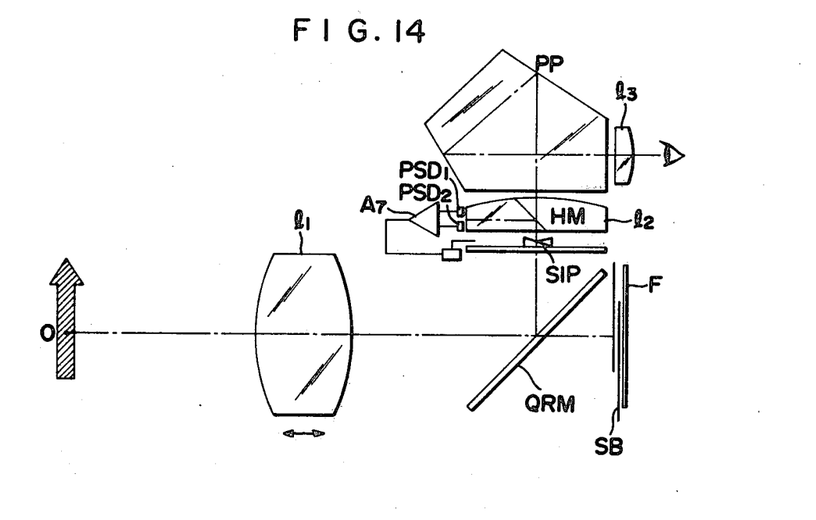
FIG. 14 shows still another embodiment of the present invention.

FIG. 14 shows still another embodiment of the present invention in which the range finder of the invention is adapted to a single lens reflex camera.

The optical image of the object O is formed on the film F through the moving lens $l_1$ as the image forming means. The moving mirror QRM is disposed between the moving lens $l_1$ and the film F. This mirror QRM is interposed between them except when a picture is taken. When the moving mirror QRM is interposed, a split image prism SIP is juxtaposed on the optical axis of the mirror. The split image prism SIP and the film F are disposed in the same relationship of position (optical path length) with respect to the moving lens $l_1$. A pair of $PSD_1$ and $PSD_2$ are so disposed that they receive the rays of light divided by the split image prism SIP in the vertical direction or to the right and left and reflected by the semi-transparent mirror HM inside the condensor lens $l_2$. These $PSD_1$ and $PSD_2$ correspond to the split image prism SIP.

Figure 15:
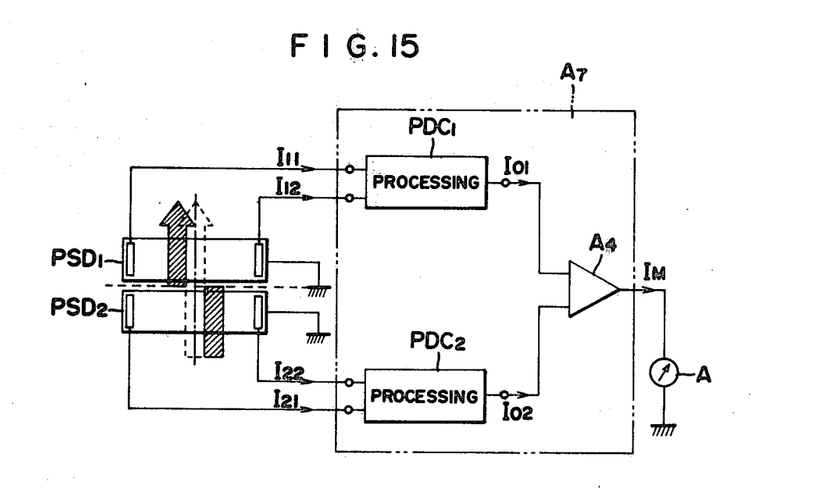
FIG. 15 shows an operation circuit of the embodiment of FIG. 14.

FIG. 15 shows an operation circuit which receives and operates the output signals $(I_{11}, I_{12})$, $(I_{21}, I_{22})$ from the abovementioned pair of $PSD_1$ and $PSD_2$ and produces a focussing signal. The output signals $(I_{11}, I_{12})$, $(I_{21}, I_{22})$ from the $PSD_1$, $PSD_2$ are applied to the position detection processing circuits $PDC_1$, $PDC_2$, respectively.

If focussing is established in FIG. 15, therefore, the division output currents $I_{01}$, $I_{02}$ from the position detection processing circuits $PDC_1$, $PDC_2$ becomes equal to each other so that the output signal $I_M$ from the differential amplifier $A_4$ becomes zero. Focussing can be obtained by adjusting the camera lens $l_1$ so that the meter A indicates a minimal value.

What is claimed is:

1. A range finder comprising:
   (a) image forming means disposed fixedly with respect to an object;
   (b) a semiconductor position detection element disposed at a position substantially corresponding to the image forming position of said image forming means;
   (c) a semi-transparent mirror disposed between said image forming means and said object;
   (d) a moving relecting mirror disposed so as to be spaced apart by a length of a basic line from said semi-transparent mirror;
   (e) driving means for relatively moving an optical image formed by said moving reflecting mirror, said semi-transparent mirror and said image forming means on said semiconductor position detection element with respect to an optical image formed by said image forming means on said semiconductor position detection element through said semi-transparent reflecting mirror;
   (f) light-interception means for temporarily intercepting a ray of light incident from said reflecting mirror to said semiconductor position detection element and memory means for temporarily storing only a signal representing an incident ray of light emanating from said object through said semi-transparent reflecting mirror during the interim while said ray of light from said reflecting mirror is intercepted; and
   (g) an operation circuit for operating on the output signals of said semiconductor position detection element and said memory means for producing a distance signal representing the distance between said object and said image forming position of said image forming means.

2. The range finder as defined in claim 1 which uses a position sensitive detector in said semiconductor position detection element.

3. A range finder comprising:
   (a) a first position detection element providing an output signal and comprising first image forming means disposed fixedly with respect to an object and a semiconductor position sensitive detector placed at a position substantially corresponding to the image forming position of said first image forming means;
   (b) a second position detection element providing an output signal and comprising second image forming means and a semiconductor position sensitive detector placed at a position substantially corresponding to the image forming position of said second image forming means;
   (c) driving means for relatively moving said second image forming means of said second position detection element; and
   (d) an operation circuit for operating on the output of said first and second position detection elements and producing a distance signal representing the distance between said object and said image forming position of said first image forming means.

4. A range finder comprising:
   (a) a light source to radiate light to an object;
   (b) an image forming means to form an image of the reflected ray of light from said object;
   (c) a position sensitive detector having a light-receiving surface disposed at a position substantially corresponding to the image forming position of said image forming means and an output signal of which varies in accordance with the light-receiving position of said image on said light-receiving surface; and
   (d) position detection processing circuit means for receiving said output signal to provide an electric signal corresponding to the distance between said object and said image forming position of said image forming means.

5. A range finder comprising: image forming means for forming the image of an object; a position sensitive detector for providing output signals and disposed in such an arrangement that the light-receiving surface thereof, which is partially masked, is eccentric with respect to the optical axis of an optical system including another image forming means, including a semi-transparent mirror, and disposed at the back of said last-recited image forming means; and an operation circuit for detecting the extreme values of the output signals of said position sensitive detector and producing a focusing signal.

6. A range finder comprising: a lens for forming the image of an object; a semi-transparent mirror behind said lens, a split image prism juxtaposed at the back of said lens for receiving an image reflected from said semi-transparent mirror; a pair of semiconductor position detection elements so disposed at the back of said split image prism as to correspond in position to the split images from said prism and for providing output signals representing said split images thereto; and an operation circuit for operating on the output signals of said semiconductor position detection elements and producing a focusing signal.

* * * * *